(12) United States Patent
Thueringer et al.

(10) Patent No.: US 10,991,187 B2
(45) Date of Patent: Apr. 27, 2021

(54) ELECTRONIC IDENTIFICATION DEVICE

(71) Applicant: NXP B.V., Eindhoven (NL)

(72) Inventors: Peter Thueringer, Graz (AT); Peter Schmallegger, Graz (AT); Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/039,931

(22) Filed: Jul. 19, 2018

(65) Prior Publication Data

US 2019/0139338 A1   May 9, 2019

(30) Foreign Application Priority Data

Nov. 6, 2017   (EP) ..................................... 17200196

(51) Int. Cl.
| | |
|---|---|
| *G07C 9/00* | (2020.01) |
| *G06K 19/07* | (2006.01) |
| *B42D 25/24* | (2014.01) |
| *G07C 9/28* | (2020.01) |
| *G06K 19/077* | (2006.01) |
| *G07C 9/21* | (2020.01) |
| *G07C 9/29* | (2020.01) |
| *H04W 4/80* | (2018.01) |

(52) U.S. Cl.
CPC .............. *G07C 9/28* (2020.01); *B42D 25/24* (2014.10); *G06K 19/077* (2013.01); *G06K 19/0723* (2013.01); *G07C 9/21* (2020.01); *G07C 9/29* (2020.01); *H04W 4/80* (2018.02)

(58) Field of Classification Search
CPC ................ B42D 25/24; G06K 19/0723; G07C 9/00015; G07C 9/00111; G07C 9/00119; H04W 4/80
See application file for complete search history.

(56) References Cited

U.S. PATENT DOCUMENTS

| | | | | |
|---|---|---|---|---|
| 5,521,590 | A * | 5/1996 | Hanaoka | ............ G06K 19/0723 340/10.51 |
| 5,963,144 | A * | 10/1999 | Kruest | ............... G06K 19/0723 340/10.1 |
| 7,446,646 | B2 | 11/2008 | Huomo | |
| 2003/0104848 | A1 | 6/2003 | Brideglall | |
| 2003/0174049 | A1 | 9/2003 | Beigel et al. | |
| 2004/0049460 | A1* | 3/2004 | Doron | .................. G06Q 20/105 705/41 |

(Continued)

FOREIGN PATENT DOCUMENTS

DE   102010008837 A1   8/2011

*Primary Examiner* — Yong Hang Jiang

(57) ABSTRACT

In accordance with a first aspect of the present disclosure, an electronic identification device is provided, comprising an ultra-high frequency (UHF) communication unit, wherein said UHF communication unit is configured to be activated restrictedly. In accordance with a second aspect of the present disclosure, a method of operating an electronic identification device is conceived, said electronic identification device comprising an ultra-high frequency (UHF) communication unit, the method comprising restrictedly activating said UHF communication unit. In accordance with a third aspect of the present disclosure, a non-transitory machine-readable medium is provided, comprising instructions that, when executed, carry out a method of the kind set forth.

12 Claims, 2 Drawing Sheets

(56) References Cited

U.S. PATENT DOCUMENTS

| | | | |
|---|---|---|---|
| 2006/0208066 A1* | 9/2006 | Finn | H04H 60/63 |
| | | | 235/380 |
| 2007/0241201 A1* | 10/2007 | Brown | G07F 7/1016 |
| | | | 235/493 |
| 2008/0018466 A1 | 1/2008 | Batra et al. | |
| 2012/0001733 A1* | 1/2012 | Kousaka | H04W 4/80 |
| | | | 340/10.1 |
| 2014/0169564 A1* | 6/2014 | Gautama | G07C 9/00309 |
| | | | 380/270 |
| 2014/0266785 A1* | 9/2014 | Miller | H04B 5/0043 |
| | | | 340/870.04 |
| 2014/0333416 A1* | 11/2014 | Eichholz | G06K 19/0724 |
| | | | 340/5.86 |
| 2014/0357187 A1* | 12/2014 | Ehrensvard | H04B 5/0031 |
| | | | 455/41.1 |
| 2016/0171201 A1* | 6/2016 | Schroder | H04B 5/0031 |
| | | | 726/20 |
| 2016/0226862 A1* | 8/2016 | Song | H04L 9/3228 |
| 2016/0342883 A1 | 11/2016 | Huhtasalo | |

* cited by examiner

ELECTRONIC IDENTIFICATION DEVICE

CROSS-REFERENCE TO RELATED APPLICATIONS

This application claims priority under 35 U.S.C. § 119 to European Patent application no. 17200196.8, filed on 6 Nov. 2017, the contents of which are incorporated by reference herein.

OVERVIEW

The present disclosure relates to an electronic identification device. Furthermore, the present disclosure relates to a method of operating an electronic identification device, and to a corresponding non-transitory machine-readable medium comprising executable instructions. Examples of electronic identification devices are electronic passports and electronic identification cards. Electronic identification devices often contain a high-security contactless communication interface, for example a near field communication (NFC) or high-frequency (HF) communication interface operating at a frequency of 13.56 MHz, which is coupled to secure processing units within said devices. This contactless communication interface enables communication over relatively small distances. In some applications, however, electronic identification devices would benefit from an increased communication distance.

SUMMARY

In accordance with a first aspect of the present disclosure, an electronic identification device is provided, comprising an ultra-high frequency (UHF) communication unit, wherein said UHF communication unit is configured to be activated restrictedly.

In an embodiment, said UHF communication unit is configured to be activated by a secured activation command received through a near field communication (NFC) unit or a high frequency (HF) communication unit of said electronic identification device.

In an embodiment, the UHF communication unit is configured to be activated for a predefined amount of time using a timer.

In an embodiment, said timer is implemented as a charged capacitor.

In an embodiment, the UHF communication unit is configured to be activated by allowing a single communication session between said UHF communication unit and an external device.

In an embodiment, the single communication session is enabled by a one-time password.

In an embodiment, the UHF communication unit is configured to be activated by allowing multiple communication sessions between said UHF communication unit and an external device.

In an embodiment, the multiple communication sessions are enabled by a rolling passcode.

In an embodiment, the electronic identification device is an electronic identification card.

In an embodiment, the electronic identification device is an electronic passport.

In accordance with a second aspect of the present disclosure, a method of operating an electronic identification device is conceived, said electronic identification device comprising an ultra-high frequency (UHF) communication unit, the method comprising restrictedly activating said UHF communication unit.

In an embodiment, said UHF communication unit is activated by a secured activation command received through a near field communication (NFC) unit or a high frequency (HF) communication unit of said electronic identification device.

In an embodiment, the UHF communication unit is activated for a predefined amount of time using a timer.

In an embodiment, said timer is implemented as a charged capacitor.

In accordance with a third aspect of the present disclosure, a non-transitory machine-readable medium is provided, comprising instructions that, when executed, carry out a method of the kind set forth.

DESCRIPTION OF DRAWINGS

Embodiments will be described in more detail with reference to the appended drawings, in which.

DESCRIPTION OF EMBODIMENTS

Figure 1:
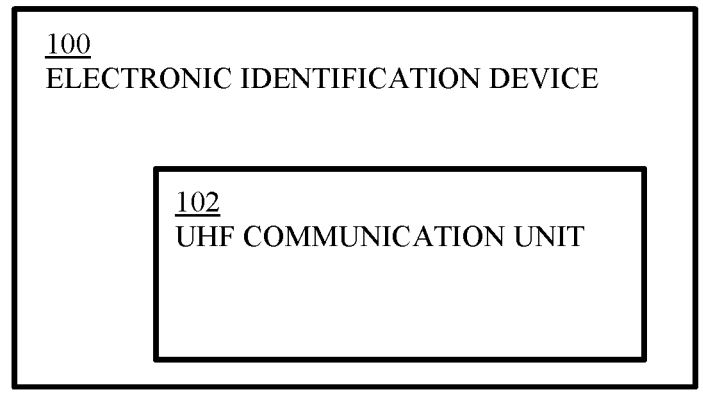
FIG. 1 shows an illustrative embodiment of an electronic identification device.

Electronic identification devices often contain a high-security contactless communication interface, for example a near field communication (NFC) or high-frequency (HF) communication interface operating at a frequency of 13.56 MHz. This contactless communication interface enables communication over relatively small distances. In some applications, however, electronic identification devices would benefit from an increased communication distance. For example, in case of an electronic passport or an electronic identification card, it would be useful to determine in a certain security area if the passport or identification card was already checked at the entrance of said area, to avoid double-checks. The NFC or HF communication interface does not enable such a determination at a large distance. An NFC or HF communication interface is often based on inductive coupling between antenna coils of communicating devices.

Therefore, in accordance with the present disclosure, an electronic identification device is provided, comprising an ultra-high frequency (UHF) communication unit. The UHF communication unit is configured to be activated restrictedly. Ultra-high frequency communication refers to communication interfaces operating at frequencies in the range between approximately 300 megahertz (MHz) and 3 gigahertz (GHz). These interfaces enable communication at larger distances. A UHF communication interface is often based on electromagnetic wave transmission.

It is noted that electronic identification documents, such as electronic passports, often already contain a UHF communication unit, specifically for logistic purposes during the production of said documents. Such a UHF communication unit is often a physically separated label glued in a document. This UHF communication unit is permanently disabled after production of said documents, to avoid that the document can be accessed inadvertently through the UHF communication unit when it has left the factory. The UHF communication unit is often permanently disabled by means of a standardized "kill" command. In contrast, in accordance with the present disclosure, the UHF communication unit is configured to be activated restrictedly, so that a larger communication range may be achieved after the electronic identification document has left the factory. Restricted activation mitigates the security risks introduced by enabling large communication ranges of electronic identification documents.

In an embodiment, the UHF communication unit is configured to be activated by a secured activation command received through an NFC unit or a HF communication unit of the electronic identification device. The activation command may for example be secured by means of a message authentication function and/or an encryption function. Thus, the UHF communication unit is not permanently disabled before the electronic identification leaves the factory, but it can for instance be reactivated by means of said secured activation command. Since the activation command is secured, the activation can only be performed or initiated by authorized users or devices. Also, the secured activation command is transmitted through the NFC or HF interface, which is inherently more secure in view of the limited communication distance enabled by said interface. The UHF communication unit may be integrated into the electronic communication device, to facilitate receiving the activation command through said NFC or HF interface.

FIG. 1 shows an illustrative embodiment of an electronic identification device 100. The electronic identification device 100 comprises a UHF communication unit 102 that is configured to be activated restrictedly. In this way, a larger communication range may be enabled, while security risks introduced by the extended communication range can still be mitigated. Compared to an NFC or HF communication unit, a UHF communication unit is less secure. Therefore, the type of data retrievable through the UHF communication unit may be limited to, for example, an identifier value or other non-critical data. Optionally, the memory content and/or memory locations which are accessible through the UHF communication unit may be defined during the activation via the NFC or HF communication unit. For instance, the accessible memory content and/or the accessible memory locations may be specified in the secured activation command.

Figure 2:
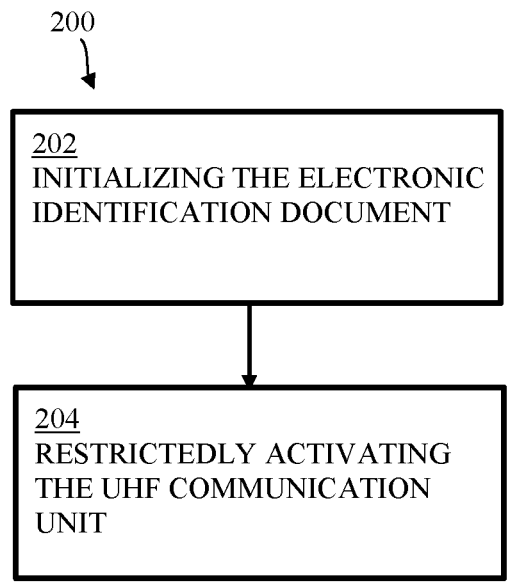
FIG. 2 shows an illustrative embodiment of a method of operating an electronic identification device.

FIG. 2 shows an illustrative embodiment of a method 200 of operating an electronic identification device of the kind set forth. The method 200 comprises, at 202, initializing the electronic identification device, and, at 204, restrictedly activating the UHF communication unit. Thus, for example, the electronic identification device may undergo an initialization or personalization process when it has left the factory. During or following this initialization process the UHF communication unit may be activated restrictedly.

In a practical and efficient implementation, the UHF communication unit is configured to be activated for a predefined amount of time using a timer. Thus, the restriction lies in the fact that the activation is temporary. In other words, the extended communication range will be available only for a limited amount of time. Furthermore, in a practical and efficient implementation, said timer is implemented as a charged capacitor. A charged capacitor is an efficient implementation of a timer, which does not require digital processing, for example. Furthermore, a charged capacitor does not require that the device is powered. The charged capacitor loses charge over time, and if the power is switched on again—by entering a UHF field—then the device may determine if the remaining charge is above a predefined threshold. If so, then the device may conclude that the predefined amount of time has not elapsed.

In an embodiment, the UHF communication unit is configured to be activated by allowing a single communication session between said UHF communication unit and an external device. Thus, in this embodiment, the restriction lies in the fact that only a single communication session is allowed. In this way, the level of security can remain relatively high. In a practical and efficient implementation, the single communication session is enabled by a one-time password. Furthermore, in an embodiment, the UHF communication unit is configured to be activated by allowing multiple communication sessions between said UHF communication unit and an external device. In this way, a better trade-off may be achieved between security and user convenience. In a practical and efficient implementation, the multiple communication sessions are enabled by a rolling passcode.

Figure 3:
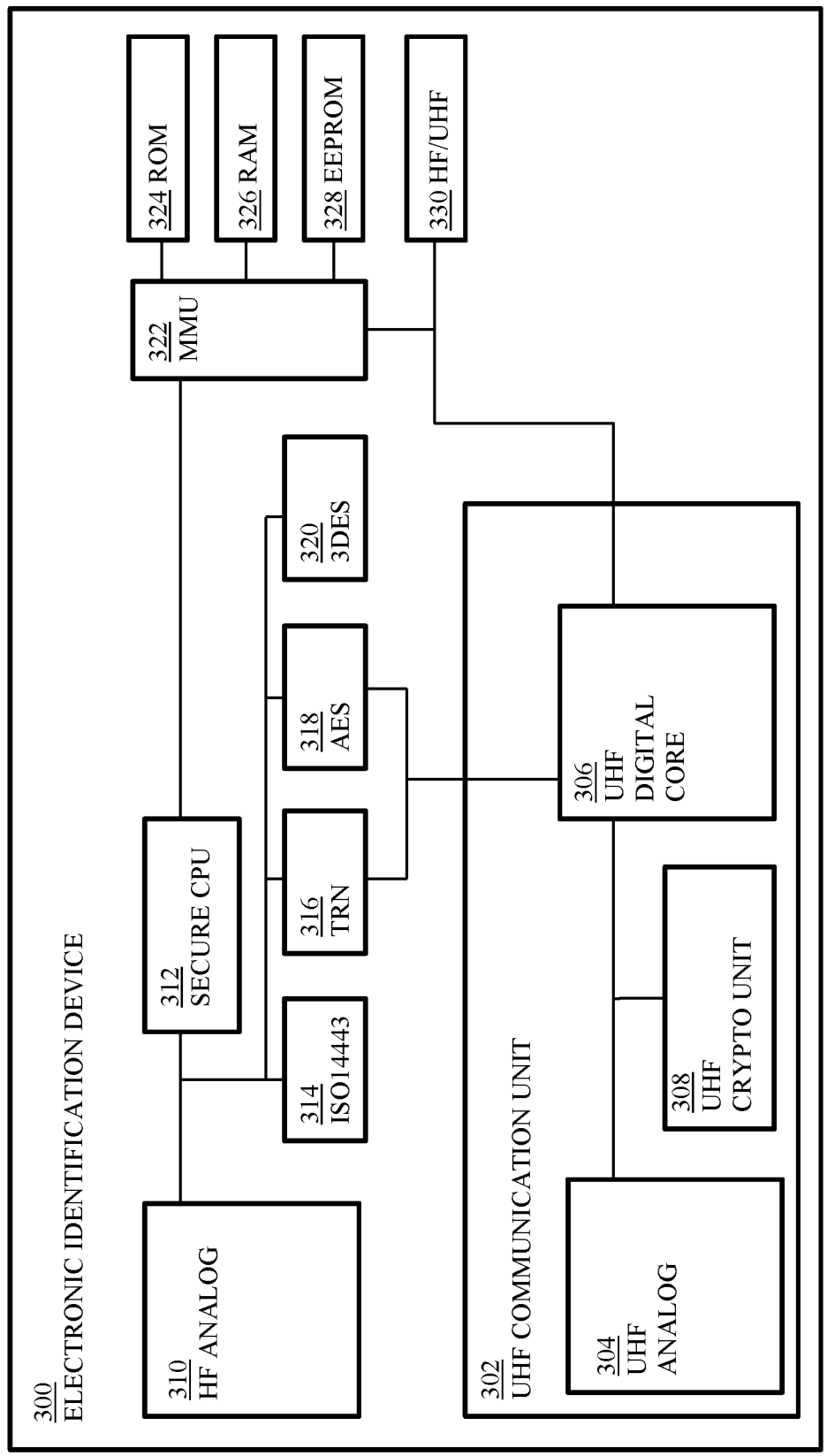
FIG. 3 shows another illustrative embodiment of an electronic identification device.

FIG. 3 shows another illustrative embodiment of an electronic identification device 300. The electronic identification device 300 comprises a UHF communication unit 302 of the kind set forth. The UHF communication unit 302 comprises a UHF analog unit 304, a UHF digital core 306 operatively coupled to the UHF analog unit 304, and a UHF cryptographic unit 308 operatively coupled to the UHF analog unit 304 and the UHF digital core 306. In accordance with the present disclosure, the UHF communication unit 302 is activated restrictedly. For instance, the UHF communication unit 302 can be activated for a predefined amount of time using a timer implemented as a charged capacitor. The charged capacitor (not shown) may form part of the UHF analog unit 304. Alternatively, or in addition, the UHF communication unit 302 can be activated by allowing a single communication session or multiple communication sessions with an external device (not shown). For this purpose, the UHF digital core 306 may allow said communication sessions after verifying a received one-time password and a rolling passcode, respectively. Cryptographic support for encrypting and decrypting communicated data may be provided by an Advanced Encryption Standard (AES) cryptographic unit 318, to which the UHF digital core 306 is coupled. It is noted that said cryptographic support may equally well be provided by the Triple Data Encryption Standard (3DES) cryptographic unit 320 shown in FIG. 3. Said cryptographic units 318, 320 are often already available in electronic identification devices, because they enable or support secure communication over the near field communication (NFC) or high-frequency (HF) communication interface. Optionally, the UHF communication unit 302 may comprise the above-mentioned UHF cryptographic unit 308 for providing said cryptographic support. Other components of the electronic identification device 300 are, as shown in FIG. 3, an HF analog unit 310, a secure central processing unit (CPU) 312, an ISO14443 unit 314, a true random number (TRN) generator 316, a memory management unit (MMU) 322, a read-only memory (ROM) 324, a random-access memory (RAM) 326, and an electrically erasable programmable read-only memory (EEPROM) 328, whose functions are generally known to the skilled person. In particular, the ISO14443 unit 314 is configured to execute ISO/IEC 14443-related commands. ISO/IEC 14443 is an international standard for contactless smart cards operating at 13.56 MHz. The UHF analog unit 304 and the HF analog unit 310 may be coupled to antennas (not shown) that enable communication with the above-mentioned external device. In a practical implementation, the analog units 304, 310 are coupled to separated antennas. Furthermore, the electronic identification device 300 comprises a HF/UHF unit 330. The HF/UHF unit 330 may be a shared memory in which non-critical data can be stored. The HF/UHF unit 330 may for example be a one-time programmable (OTP) non-volatile memory, multi-time programmable (MTP) non-volatile memory, an electrically erasable programmable read-only memory (EEPROM), or a persistent counter written or increased via the HF interface.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS 100 electronic identification device
102 UHF communication unit
200 method of operating an electronic identification device
202 initializing the electronic identification device
204 restrictedly activating the UHF communication unit
300 electronic identification device
302 UHF communication unit
304 UHF analog unit
306 UHF digital core
308 UHF cryptographic unit
310 HF analog unit
312 secure central processing unit
314 ISO14443 unit
316 true random number generator
318 AES cryptographic unit
320 3DES cryptographic unit
322 memory management unit
324 read-only memory
326 random-access memory
328 electrically erasable programmable read-only memory
330 HF/UHF unit

The invention claimed is:

1. An electronic identification device comprising an ultra-high frequency, UHF, communication unit, wherein said UHF communication unit is configured to be activated restrictedly, wherein said UHF communication unit is configured to be activated restrictedly by a secured activation command received through a near field communication, NFC, unit of said electronic identification device, wherein the UHF communication unit is configured to be activated restrictedly in that after activation, operation of the UHF communication unit is restricted in that:
   the UHF communication unit is configured to be activated for a predefined amount of time using a timer; and
   the UHF communication unit is configured to be activated by allowing only a single communication session between said UHF communication unit and an external device, wherein the single communication session is enabled by a one-time password.

2. The electronic identification device of claim 1, wherein said timer is implemented as a charged capacitor.

3. The electronic identification device of claim 1, being an electronic identification card.

4. The electronic identification device of claim 1, being an electronic passport.

5. A method of operating an electronic identification device comprising an ultra-high frequency, UHF, communication unit, comprising restrictedly activating said UHF communication unit, wherein said UHF communication unit is restrictedly activated by a secured activation command received through a near field communication, NFC, unit of said electronic identification device, wherein the UHF communication unit is configured to be activated restrictedly in that after activation, operation of the UHF communication unit is restricted in that:
   the UHF communication unit is configured to be activated for a predefined amount of time using a timer; and
   the UHF communication unit is configured to be activated by allowing only a single communication session between said UHF communication unit and an external device, wherein the single communication session is enabled by a one-time password.

6. The method of claim 5, wherein said timer is implemented as a charged capacitor.

7. A non-transitory machine-readable medium comprising instructions that, when executed, carry out the functions of the electronic identification device of claim 1.

8. The electronic identification device of claim 1, wherein the UHF communication unit is configured to be activated restrictedly in that after activation, operation of the UHF communication unit is restricted in that at least one of memory content stored in the electronic identification device and a memory location within the electronic identification device that is accessible through the UHF communication unit is specified in the secured activation command received through the NFC unit.

9. The method of claim 5, wherein the UHF communication unit is configured to be activated restrictedly in that after activation, operation of the UHF communication unit is restricted in that at least one of memory content stored in the electronic identification device and a memory location within the electronic identification device that is accessible through the UHF communication unit is specified in the secured activation command received through the NFC unit.

10. An electronic identification device comprising an ultra-high frequency, UHF, communication unit, wherein said UHF communication unit is configured to be activated restrictedly, wherein said UHF communication unit is configured to be activated restrictedly by a secured activation command received through a near field communication, NFC, unit of said electronic identification device, wherein the UHF communication unit is configured to be activated restrictedly in that after activation, operation of the UHF communication unit is restricted in that:

the UHF communication unit is configured to be activated for a predefined amount of time using a timer; and
the UHF communication unit is configured to be activated by allowing only a single communication session between said UHF communication unit and an external device, wherein the single communication session is enabled by a one-time password; and
wherein at least one of memory content stored in the electronic identification device and a memory location within the electronic identification device that is accessible through the UHF communication unit is specified in the secured activation command received through the NFC unit.

11. The electronic identification device of claim 10, being an electronic identification card.

12. The electronic identification device of claim 10, being an electronic passport.

* * * * *